United States Patent
Zeng et al.

(10) Patent No.: US 10,051,636 B2
(45) Date of Patent: Aug. 14, 2018

(54) DEVICE BASED TWO-STAGE RANDOM RESOURCE SELECTION FOR SMALL DATA TRANSMISSION

(71) Applicant: QUALCOMM Incorporated, San Diego, CA (US)

(72) Inventors: Wei Zeng, San Diego, CA (US); Joseph Binamira Soriaga, San Diego, CA (US); Tingfang Ji, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 15/048,254

(22) Filed: Feb. 19, 2016

(65) Prior Publication Data
US 2016/0270083 A1    Sep. 15, 2016

Related U.S. Application Data

(60) Provisional application No. 62/133,343, filed on Mar. 14, 2015.

(51) Int. Cl.
*H04W 72/04* (2009.01)
*H04W 74/08* (2009.01)
*H04W 72/12* (2009.01)

(52) U.S. Cl.
CPC ... *H04W 72/0486* (2013.01); *H04W 72/0446* (2013.01); *H04W 74/08* (2013.01); *H04W 72/1289* (2013.01); *H04W 74/0866* (2013.01)

(58) Field of Classification Search
None
See application file for complete search history.

(56) References Cited

U.S. PATENT DOCUMENTS

| | | |
|---|---|---|
| 2010/0268951 A1 | 10/2010 | Ryu |
| 2011/0176500 A1 | 7/2011 | Wager et al. |

(Continued)

FOREIGN PATENT DOCUMENTS

| | | |
|---|---|---|
| WO | WO-2014056426 A1 | 4/2014 |
| WO | WO-2015065130 A1 | 5/2015 |

OTHER PUBLICATIONS

International Preliminary Report on Patentability—PCT/US2016/021500—ISA/EPO—dated Feb. 6, 2017.

(Continued)

*Primary Examiner* — Charles C Jiang
*Assistant Examiner* — Saad Khawar
(74) *Attorney, Agent, or Firm* — Qualcomm IP Dept.; James Hunt Yancey, Jr.

(57) ABSTRACT

Wireless communications systems and methods related to the reduction in a probability of collision for grant-less transmissions from internet of everything (IOE) devices while not increasing search complexity at a base station are disclosed. An IOE device randomly selects a first access resource from a common pool, that the base station searches, to initiate a transmission. If a metric associated with the data transmission is predicted to exceed a threshold, the IOE device also randomly selects a second access resource from a collision reduction pool that the base station does not search. The IOE device notifies the base station, in the data transmission, to switch to the second access resource after a fixed period to the selected second access resource that is included in the data transmission. After the specified period, the base station and the IOE device switch to the second access resource and complete the data transmission.

30 Claims, 7 Drawing Sheets

(56) References Cited

U.S. PATENT DOCUMENTS

| | | | |
|---|---|---|---|
| 2011/0274040 A1 | 11/2011 | Pani et al. | |
| 2012/0044878 A1 | 2/2012 | Ratasuk et al. | |
| 2012/0213196 A1* | 8/2012 | Chung | H04B 1/713 370/330 |
| 2013/0163537 A1 | 6/2013 | Anderson et al. | |
| 2013/0273951 A1 | 10/2013 | Wang et al. | |
| 2013/0336234 A1 | 12/2013 | Ghosh et al. | |
| 2014/0086220 A1 | 3/2014 | Shi et al. | |
| 2014/0146754 A1 | 5/2014 | Bayesteh et al. | |
| 2014/0254544 A1 | 9/2014 | Kar et al. | |
| 2015/0023281 A1 | 1/2015 | Wu et al. | |
| 2015/0156806 A1* | 6/2015 | Pan | H04W 72/121 455/39 |
| 2015/0173060 A1 | 6/2015 | Ge et al. | |
| 2015/0208332 A1 | 7/2015 | Baghel et al. | |
| 2015/0215903 A1 | 7/2015 | Zhao et al. | |
| 2016/0249198 A1* | 8/2016 | Kim | H04W 48/16 |
| 2016/0255654 A1* | 9/2016 | Lin | H04L 5/0048 370/329 |
| 2016/0270053 A1 | 9/2016 | Zeng et al. | |
| 2017/0181089 A1* | 6/2017 | Baker | H04W 52/0229 |

OTHER PUBLICATIONS

Fujitsu: "Resource Allocation for Discovery Signal," R1-140200, 3GPP TSG-RAN WG1 Meeting #76, Prague, Czech Republic, Feb. 10-14, 2014, 3 Pages.

International Search Report and Written Opinion—PCT/US2016/021500—ISA/EPO—dated Aug. 1, 2015.

\* cited by examiner

DEVICE BASED TWO-STAGE RANDOM RESOURCE SELECTION FOR SMALL DATA TRANSMISSION

CROSS REFERENCE TO RELATED APPLICATIONS

The present application claims priority to and the benefit of the U.S. Provisional Patent Application No. 62/133,343, filed Mar. 14, 2015, each of which is hereby incorporated by reference in its entirety.

TECHNICAL FIELD

This application relates to wireless communication systems, and more particularly to improving uplink communications from communications devices such as "internet of everything" (IOE) devices to base stations (or other communications devices) that have access to a shared common pool of access resources.

INTRODUCTION

Data traffic on networks, such as cellular networks, has grown rapidly in recent years. This growth has been spurred on with the ever-increasing functionality of traditional mobile devices (such as cellular telephones/smartphones) as well as other connected devices such as tablets, laptop computers, and "smart terminals" such as IOE (also referred to as the "internet of things") devices. Some examples of smart terminals include devices that integrate sensors or meters to capture information that is then relayed to a remote system, such as a central server. This can include smart metering, temperature monitoring, pressure monitoring, fluid flow monitoring, inventory monitoring, water level monitoring, equipment monitoring, healthcare monitoring, wildlife monitoring, weather and geological event monitoring, fleet management and tracking, remote security sensing, physical access control, transaction-based business charging, and other applications.

Before these devices may transmit any data on a network, they must establish a radio link connection with the network that includes a lengthy signaling procedure for requesting use of an access resource (e.g., time and/or frequency elements in resource blocks) and a subsequent grant of the access resource from the base station. The amount of overhead and/or time required to establish a radio link connection using the access request/grant approach becomes a problem for IOE devices, which typically (given their nature) are embedded with devices or objects typically designed to consume low amounts of power and have low cost. For example, an IOE device (such as a smart meter for a utility) may be expected to last years without replacement or recharge (if recharging is possible).

BRIEF SUMMARY OF SOME EMBODIMENTS/EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Instead of access request/grant it may be more energy efficient to implement a grant-less transmission regime. For grant-less transmission, the IOE device directly starts transmission of its data (which is typically a small amount as compared to voice/video/etc.) without waiting for the base station (or other network element) to assign access resources. To enable this, a common pool having a finite number of access resources (such as frequencies, time slots, and/or codewords) may be maintained that the IOE devices uses to select one or more access resources from to begin the grant-less transmission.

Although there may be a relatively low probability of two or more IOE devices selecting the same access resource(s) from the common pool at the same time (referred to as a "collision"), situations sometimes occur that change this probability. For example, IOE devices that suffer from a large amount of path loss (such as caused by being located far from a base station and/or being deployed in a high-attenuation environment such as a basement or other structure(s)) require significantly longer transmission times than other IOE devices accessing the same common pool of access resources. As a result, the IOE device that requires a longer transmission time has a much higher probability of colliding with new transmissions from other IOE devices that attempt to use the same access resource(s) from the common pool. While increasing the common pool size may help reduce collision probability, it has the drawback of adding search complexity to the base station.

As a result, there is a need for techniques to reduce the probability of collisions when selecting access resources available in a common pool of access resources for grant-less transmissions in a network, such as a cellular network, while not increasing the search complexity at the base station. It is to the provision of such aspects and features that arrangements and embodiments of the technology discussed herein are directed.

For example, in an aspect of the disclosure, a method for wireless communication includes transmitting, from a first wireless communications device to a second wireless communications device, a first set of data using a first access resource selected from a common pool of access resources as part of a grant-less transmission; notifying, by the first wireless communications device, the second wireless communications device of a transition to a second access resource selected from a collision reduction pool in response to a determination that the grant-less transmission exceeds a threshold, the collision reduction pool being separate from, and larger than, the common pool; and transmitting, by the first wireless communications device, a second set of data to the second wireless communications device using the second access resource after transitioning to the second access resource.

In an additional aspect of the disclosure, a method for wireless communication includes searching, by a first wireless communications device, a common pool of access resources to recover a first set of data received from a second wireless communications device using a first access resource selected from the common pool of access resources as part of a grant-less transmission; receiving, at the first wireless communications device, a notification from the second wireless communications device to transition to a second access resource selected from a collision reduction pool, the collision reduction pool being separate from, and larger than, the common pool; and switching, at the first wireless communications device, to the second access resource to recover a second set of data from the second wireless communications device without searching the collision reduction pool.

In an additional aspect of the disclosure, a first wireless communications device includes a processor configured to select a first access resource from a common pool of access resources as part of a grant-less transmission to a first wireless communications device and, in response to a determination that the grant-less transmission exceeds a threshold, select a second access resource from a collision reduction pool, the collision reduction pool being separate from, and larger than, the common pool; and a transceiver configured to transmit a first set of data to the first wireless communications device using the first access resource, wherein the first subset of data includes a notification for the first wireless communications device of a transition to the second access resource in response to the determination, the transceiver being further configured to transmit a second set of data to the first wireless communications device using the second access resource.

In an additional aspect of the disclosure, a first wireless communications device includes a transceiver configured to receive a first set of data from a second wireless communications device, wherein the first set of data is transmitted using a first access resource selected from a common pool of access resources as part of a grant-less transmission from the second wireless communications device; a search module configured to search the common pool of access resources to recover the first subset of the data received from the second wireless communications device, wherein the transceiver is further configured to receive a notification from the second wireless communications device to transition to a second access resource selected from a collision reduction pool, the collision reduction pool being separate from, and larger than, the common pool; and a processor configured to switch the transceiver to the second access resource to recover a second set of data from the second wireless communications device without searching the collision reduction pool.

In an additional aspect of the disclosure, a computer-readable medium having program code recorded thereon includes program code comprising code for causing a first wireless communications device to transmit, to a second wireless communications device, a first set of data using a first access resource selected from a common pool of access resources as part of a grant-less transmission; code for causing the first wireless communications device to notify the second wireless communications device of a transition to a second access resource selected from a collision reduction pool in response to a determination that the grant-less transmission exceeds a threshold, the collision reduction pool being separate from, and larger than, the common pool; and code for causing the first wireless communications device to transmit a second set of data to the second wireless communications device using the second access resource after transitioning to the second access resource.

In an additional aspect of the disclosure, a computer-readable medium having program code recorded thereon includes program code comprising code for causing a first wireless communications device to search a common pool of access resources to recover a first set of data received from a second wireless communications device using a first access resource selected from the common pool of access resources as part of a grant-less transmission; code for causing the first wireless communications device to receive a notification from the communications device to transition to a second access resource selected from a collision reduction pool, the collision reduction pool being separate from, and larger than, the common pool; and code for causing the first wireless communications device to switch to the second access resource to recover a second set of data from the second wireless communications device without searching the collision reduction pool.

In an additional aspect of the disclosure, a first wireless communications device includes means for transmitting, to a second wireless communications device, a first set of data using a first access resource selected from a common pool of access resources as part of a grant-less transmission; means for notifying the second wireless communications device of a transition to a second access resource selected from a collision reduction pool in response to a determination that the grant-less transmission exceeds a threshold, the collision reduction pool being separate from, and larger than, the common pool; and means for transmitting a second set of data to the second wireless communications device using the second access resource after transitioning to the second access resource.

In an additional aspect of the disclosure, a first wireless communications device includes means for searching a common pool of access resources to recover a first set of data received from a second wireless communications device using a first access resource selected from the common pool of access resources as part of a grant-less transmission; means for receiving a notification from the second wireless communications device to transition to a second access resource selected from a collision reduction pool, the collision reduction pool being separate from, and larger than, the common pool; and means for switching to the second access resource to recover a second set of data from the second wireless communications device without searching the collision reduction pool.

Other aspects, features, and embodiments of the present disclosure will become apparent to those of ordinary skill in the art upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
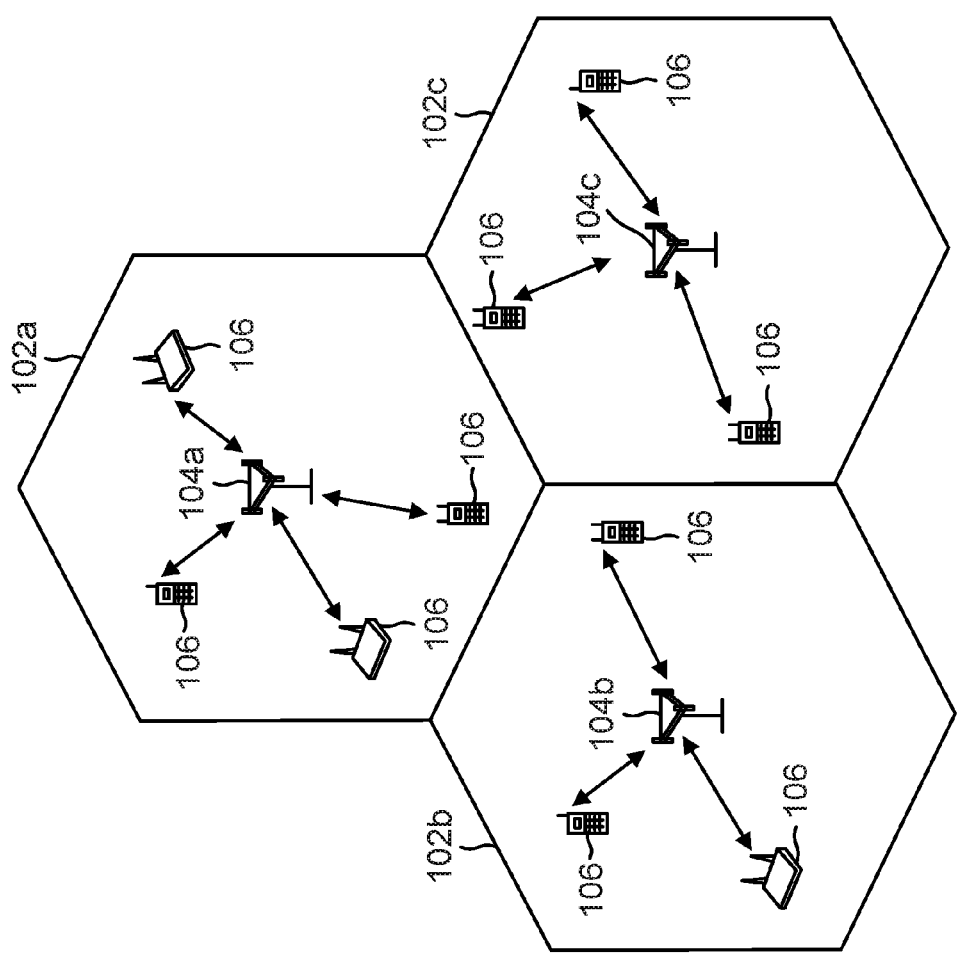
FIG. 1 is a diagram of an exemplary wireless communications environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new (e.g., 4G networks) releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to reduce a probability of collisions between communication devices. For example, certain features enable and provide collision reduction of communications between different internet of everything (IOE) devices that engage in grant-less transmissions to base stations. This can be accomplished while not increasing search complexities for network-side components, e.g. at a base station. To accomplish this, two different pools of access resources are generally provided. The first pool is a common pool of access resources which has a relatively small number of access resources, which the base station searches. The second pool is a collision reduction pool of access resources which has a relatively large number of access resources that the base station does not search. Both are broadcast from the base station.

In some embodiments, an IOE device that has data to send selects a first access resource from the common pool (e.g., randomly) to use in transmitting the data to the base station in a grant-less transmission. If the IOE device predicts (e.g., based on some monitored metric(s) of the downlink) that the data transmission will not exceed a threshold (e.g., the received signal strength (RSS) of the downlink channel is greater than a threshold value, signal-to-noise ratio (SNR) of the channel is greater than a threshold value, a data size is smaller than a threshold amount, and/or an estimated or actual transmission time exceeds a predetermined amount), then the IOE device initiates and completes the transmission using the first access resource.

If the IOE device predicts that the data transmission (e.g., some predicted metric of the transmission) will exceed the threshold, the IOE device also selects a second access resource from the collision reduction pool (e.g., randomly). The IOE device includes the second access resource as part of a notification in the transmission to the base station to indicate to the base station to transition to the second access resource in communicating with the IOE device after a specified number of subframes.

After the specified number of subframes has passed, the IOE device and the base station transition to the second access resource and complete the transmission. By switching to the second access resource, an IOE device that predicts a longer transmission time can reduce the probability that another IOE device will randomly select the same access resource from the smaller common pool before the IOE device has completed its transmission. Further, this can be accomplished without adding to the search complexity at the base station (e.g., by adding many more access resources to the collision reduction pool that is not searched rather than to the common pool that is searched).

FIG. 1 illustrates a wireless communication network 100 in accordance with various aspects of the present disclosure. The wireless network 100 may include a number of base stations 104 and a number of user equipment (UE) 106, all within one or more cells 102 as illustrated in FIG. 1. The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

A base station 104 as discussed herein may have various characteristics. In some scenarios, it may include an evolved Node B (eNodeB) in the LTE context, for example. A base station 104 may also be referred to as a base transceiver station or an access point. It will be recognized that there could be one to many base stations, as well as be an assortment of different types such as macro, pico, and/or femto base stations. The base stations 104 may communicate with each other and other network elements via one or more backhaul links. The base stations 104 communicate with the UEs 106 as shown, including via direct wireless connections or indirect, e.g. via relay devices. A UE 106 may communicate with a base station 104 via an uplink and a downlink. The downlink (or forward link) refers to the communication link from a base station 104 to a UE 106. The uplink (or reverse link) refers to the communication link from a UE 106 to a base station 104.

The UEs 106 may be dispersed throughout the wireless network 100, and each UE 106 may be stationary or mobile. A UE may also be referred to as a terminal, a mobile station, a subscriber unit, etc. A UE 106 may be a cellular phone, a smartphone, a personal digital assistant, a wireless modem, a laptop computer, a tablet computer, an entertainment device, medical device/equipment, biometric devices/equipment, fitness/exercise devices, vehicular components/sensors, etc. The wireless communication network 100 is one example of a network to which various aspects of the disclosure apply.

According to embodiments of the present disclosure, some of the UEs 106 may be internet of everything (IOE) devices, and reference herein will be made to IOE devices 106, though it will be recognized that this is done for purposes of simplicity only and that the base stations 104 may communicate with a variety of different types of devices at the same or different times. More or fewer IOE devices 106 than those shown may be deployed within the communications environment 100. IOE devices 106 may either be stand-alone or integrated within other devices. The IOE devices 106 may capture information that is then relayed to a remote system. IOE devices 106 may have limited power resources because they are integrated with devices or objects, such as to render those devices or objects "smart," and need to be able to operate for long periods of time without replacement or recharge, e.g. days, weeks, months, or years. As a result, the IOE devices 106 may synchronize with a beacon that the base stations 104 periodically emit. As a result of this synchronization, each of the IOE devices 106 may only awake at predefined time intervals according to the beacon in order to decrease power consumption. In addition to communication with the base stations 104, the IOE devices 106 can be capable of linking to each other, for example via D2D (e.g., peer-to-peer and/or mesh) links.

The techniques described herein may be used for a single-input single-output (SISO) system, a single-input multiple-output (SIMO) system, a multiple-input single-output (MISO) system, and a multiple-input multiple-output (MIMO) system. These techniques may be used for a non-orthogonal-based system and for other multi-carrier communication systems. Further, embodiments of this disclosure are directed to any type of modulation scheme, but non-orthogonal waveforms are used for purposes of illustration. Non-orthogonal waveforms are useful according to embodiments of the present disclosure because often the IOE devices 106 have only small amounts of data to transmit during a given wake-up period, and other types of modulation would consume significantly more overhead and other resources, prematurely draining the battery life of the IOE devices 106. Also, the IOE devices 106 typically operate at low power ranges, resulting in less interference in shared frequencies/time slots than would occur with more powerful UEs 106. Non-orthogonal waveforms that rely on scrambling codes or interleaving may be used, for example, where the cells 102 are large and a frequency bandwidth has been dedicated for IOE device communications. Frequency may be relied upon, for example, in environments where the cells 102 have small coverage areas and the IOE devices 106 share the same bandwidth with other competing devices, such as other types of UEs.

As will be discussed in more detail below, an IOE device 106 first initiates a grant-less transmission by selecting an access resource from a common pool of access resources (e.g., randomly). Because other IOE devices 106 accessing the same base station 104 randomly select from the same common pool (and, for example, do not engage in carrier sensing as IOE devices 106 may be dispersed far enough away that it is not desirable and/or possible), there is a probability of collision that two IOE devices 106 randomly select the same access resource from the common pool. Often, the data that the IOE devices 106 are sending with the grant-less transmissions are sufficiently small (e.g., a few hundred bytes) that, even with a relatively low data rate, the IOE device 106 uses the selected access resource for a short duration (and, therefore, less probability that another IOE device 106 will randomly select the same access resource during the grant-less transmission).

Situations may arise, however, that may cause the transmission to last longer, which increases the probability of access collision with another IOE device 106 that may randomly select the same access resource before the first IOE device 106 has finished its grant-less transmission. This situation may arise, for example, where the connection with the base station 104 is poor (e.g., significant path loss between the IOE device 106 and the base station 104, or the IOE device 106 is situated in a high-attenuation environment), an increase in the number of active devices within the cell, and the traffic pattern of each device to name some examples.

To address this problem, the common pool of access resources could be increased to have more access resources available for random selection. Doing so reduces the probability of collisions as each IOE device 106 randomly selects an access resource from the common pool. As the number of access resources in the common pool increases, however, the search complexity for the base station increases as well which becomes undesirable. Search complexity, as used herein, refers to the need of the base station 104 to repeatedly search through the different access resources (combinations of times and scrambling codes/interleaving permutations as discussed further below) as it receives grant-less transmissions from the various IOE devices 106 within its coverage. The base station 104 performs this searching because, due to the grant-less transmission, the base station 104 does not know when particular IOE devices 106 wake up or what access resources they select until the base station 104 receives a transmission. In an embodiment, the base station 104 searches by comparing a received grant-less transmission to each scrambling code or interleaver in the common pool of access resources in order to detect which particular scrambling code or interleaver results in a high energy output.

Because the search complexity increases as the size of the common pool of access resources increases, the common pool of access resources may be kept to a manageable size, thereby gaining an upper bound on the amount of search complexity at the base station but limiting how much the probability of collision may reduce. To address this continuing need to reduce the probability of collision, embodiments of the present disclosure provide an additional collision reduction pool of access resources. Continuing with the example for FIG. 1, when the situation arises that the IOE device 106 determines that the grant-less transmission will exceed some threshold metric (e.g., the received signal strength (RSS) of the downlink channel is less than a threshold value, signal-to-noise ratio (SNR) of the channel is less than a threshold value, a data size is bigger than a threshold amount, and/or an estimated or actual transmission time exceeds a predetermined amount), then the IOE device 106 further randomly selects an access resource from the collision reduction pool.

The IOE device 106 notifies the base station 104 of the selected access resource from the collision reduction pool, as well as a specified number of subframes to wait until transitioning to the selected access resource from the collision reduction pool, as part of a grant-less transmission to the base station 104 while using an access resource from the common pool. In an alternative embodiment, the specified number of subframes may have been previously established or set in a network broadcast. After waiting the specified number of subframes, both the IOE device 106 and the base station 104 transition to the selected access resource from the collision reduction pool and continue communication until the data is done transmitting.

According to embodiments of the present disclosure, the collision reduction pool helps further reduce the probability of collision between grant-less transmissions of IOE devices 106 while still limiting the search complexity for the base station 104. This is because the base station 104 focuses its repeated searching on the common pool instead of the collision reduction pool, where the collision reduction pool may have a significantly larger amount of access resources than those available in the common pool.

Figure 2:
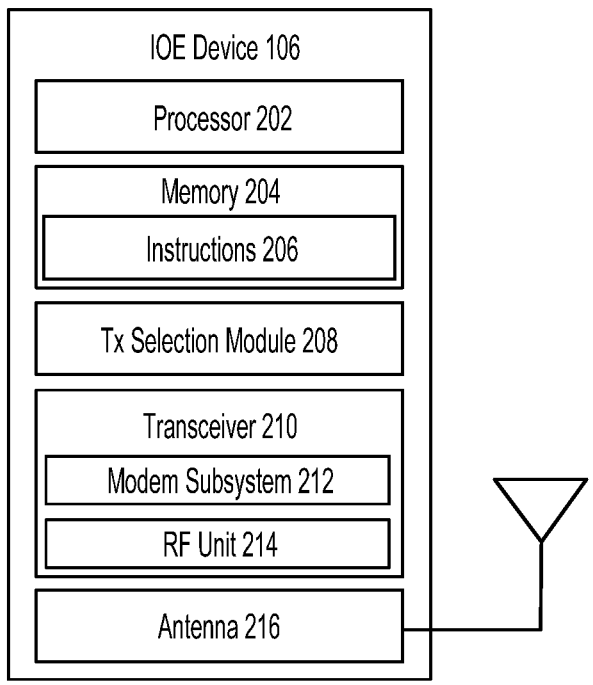
FIG. 2 is a block diagram of an exemplary communications device according to embodiments of the present disclosure.

FIG. 2 is a block diagram of an IOE device 106 according to embodiments of the present disclosure. The IOE device 106 may have any one of many configurations for various IOE applications described above. The IOE device 106 may include a processor 202, a memory 204, a transmission access resource selection module 208, a transceiver 210, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the IOE devices 106 introduced above with respect to FIG. 1 and discussed in more detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the IOE device 106 in connection with embodiments of the present disclosure. Instructions 206 may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The transmission access resource selection module 208 may be used to randomly select an access resource from the common pool as well as an access resource from the collision reduction pool, described above with respect to FIG. 1 and below with respect to FIG. 5. The transmission access resource selection module 208 may randomly select the access resource from the common pool for use in initiating a grant-less transmission to the base station 104. At the same time or at a later time, the transmission access resource selection module 208 may also randomly select an access resource from the collision reduction pool. The transmission access resource selection module 208 may select the access resource from the collision reduction pool in response to first predicting or determining that the data to be transmitted will take a sufficiently long time that collisions with other IOE devices 106 become more likely (e.g., other IOE devices 106 may randomly select the same access resource from the common pool before the IOE device 106 completes transmission of its data).

For example, the transmission access resource selection module 208 may cooperate with other elements of the IOE device 106 to determine one or more parameters/metrics of one or both of a downlink from the base station 104 or an uplink to the base station 104. In one embodiment, the IOE device 106 monitors downlink information from the base station 104 (e.g., one or more broadcasts/beacons/other types of synchronization signals) to determine the RSS and/or SNR of the downlink channel. The transmission access resource selection module 208 may use this information to predict a quality (e.g., RSS, SNR, estimated total transmission time) of the uplink channel prior to the IOE device 106 initiating a grant-less transmission to the base station 104. The transmission access resource selection module 208 may further compare the prediction to one or more threshold values and determine, prior to initiating the grant-less transmission, to also randomly select a second access resource from the collision reduction pool. In an embodiment, the transmission access resource selection module 208 may select both of the access resources (from the common pool/collision reduction pool) at or near the same time. With the selection made, the IOE device 106 may initiate a grant-less transmission using the first selected access resource from the common pool. As part of the transmission, the transmission access resource selection module 208 may cause the second selected access resource (from the collision reduction pool) to be included as well, along with a specified number of subframes (or period of time, etc. to name just two examples) before switching to the second selected access resource from the collision reduction pool.

As another example, the transmission access resource selection module 208 may provide the first selected access resource from the common pool for use in initiating a grant-less transmission without also selecting the second access resource from the collision reduction pool yet, based on a prediction that the transmission should be of sufficiently short duration that a has a lower probability of collision. As transmission starts, however, the IOE device 106 may monitor the uplink to the base station 104 and, based on the uplink quality and/or transmission duration, determine during transmission that the probability of collision is increasing beyond a threshold level (e.g., by determining a signal metric, data size metric, transmission time metric, etc.). This may trigger the transmission access resource selection module 208 to select the second access resource from the collision reduction pool and notify, during the transmission, the base station 104 to switch to the selected second access resource from the collision reduction pool after a specified number of subframes. In this way, the selection from the collision reduction pool is delayed until the transmission access resource selection module 208 determines that switching may be useful to reduce the probability of collision.

The transceiver 210 may include a modem subsystem 212 and a radio frequency (RF) unit 214. The transceiver 210 is configured to communicate bi-directionally with other devices, such as base stations 104. The modem subsystem 212 may be configured to modulate and/or encode the data from the memory 204 and/or the transmission access resource selection module 208 (and/or from another source, such as some type of sensor) according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station 104. Although shown as integrated together in transceiver 210, the modem subsystem 212 and the RF unit 214 may be separate devices that are coupled together at the IOE device 106 to enable the IOE device 106 to communicate with other devices.

The RF unit 214 may provide the modulated and/or processed data, e.g. data packets (or, more generally, data messages which may contain one or more data packets and other information), to the antenna 216 for transmission to one or more other devices. This may include, for example, transmission of data to a base station 104 according to embodiments of the present disclosure. The antenna 216 may further receive data messages transmitted from a base station 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
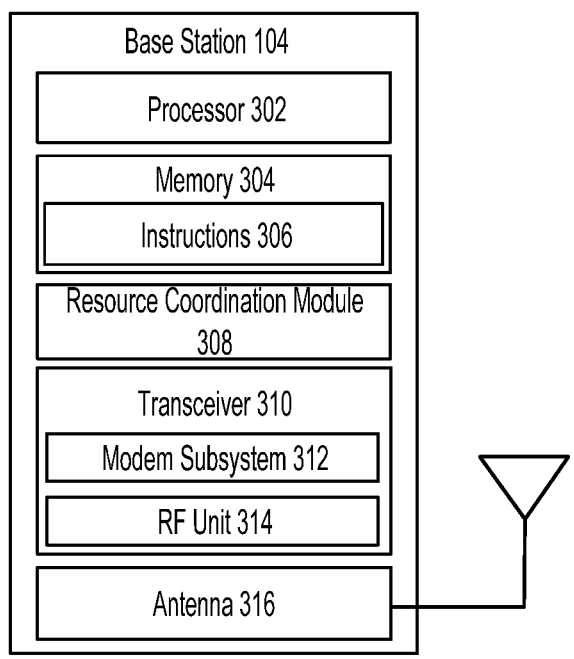
FIG. 3 is a block diagram of an exemplary base station according to embodiments of the present disclosure.

FIG. 3 is a block diagram of an exemplary base station 104 according to embodiments of the present disclosure. The base station 104 may include a processor 302, a memory 304, a resource coordination module 308, a transceiver 310, and an antenna 316. These elements may be in direct or indirect communication with each other, for example via one or more buses. The base station 104 may be an evolved Node B (eNodeB), a macro cell, a pico cell, a femto cell, a relay station, an access point, or another electronic device operable to perform the operations described herein with respect to the base station 104. The base station 104 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2.

The resource coordination module 308 may operate to search all of the scrambling codes, interleaver permutations, and/or frequencies maintained by the common pool (e.g., a copy of which is stored in the memory 304 that matches the common pool stored at the IOE devices 106) periodically or continuously to attempt to identify data streams that arrive from one or more IOE devices 106. According to embodiments of the present disclosure, the common pool is kept to a relatively small size so as to limit the search complexity (and corresponding computing resources utilization) imposed on the base station 104. As noted previously, the resource coordination module 308 (also referred to as a search module 308) focuses its searching on the common pool and does not search the collision reduction pool.

The transceiver 310 may include a modem subsystem 312 and a radio frequency (RF) unit 314. The transceiver 310 is configured to communicate bi-directionally with other devices, such as IOE devices 106 (and other types of UEs 106). The modem subsystem 312 may be configured to modulate and/or encode data according to a MCS, some examples of which have been listed above with respect to FIG. 2. The RF unit 314 may be configured to process (e.g., perform analog to digital conversion or digital to analog conversion, etc.) of modulated/encoded data from the modem subsystem 312 (on outbound transmissions) or of transmissions originating from another source, such as an IOE device 106. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets, to the antenna 316 for transmission to one or more other devices such as IOE devices 106. The modem subsystem 312 may modulate and/or encode the data in preparation for transmission. The RF unit 314 may receive the modulated and/or encoded data packet and process the data packet prior to passing it on to the antenna 316. This may include, for example, transmission of data messages to IOE devices 106 or to another base station 104, according to embodiments of the present disclosure. As another example, this may also include a broadcast of one or both of the common pool and the collision reduction pool to any IOE devices 106 (and/or other device types) within broadcast range of the base station 104. The antenna 316 may further receive data messages transmitted from IOE devices 106 and/or other UEs 106, and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
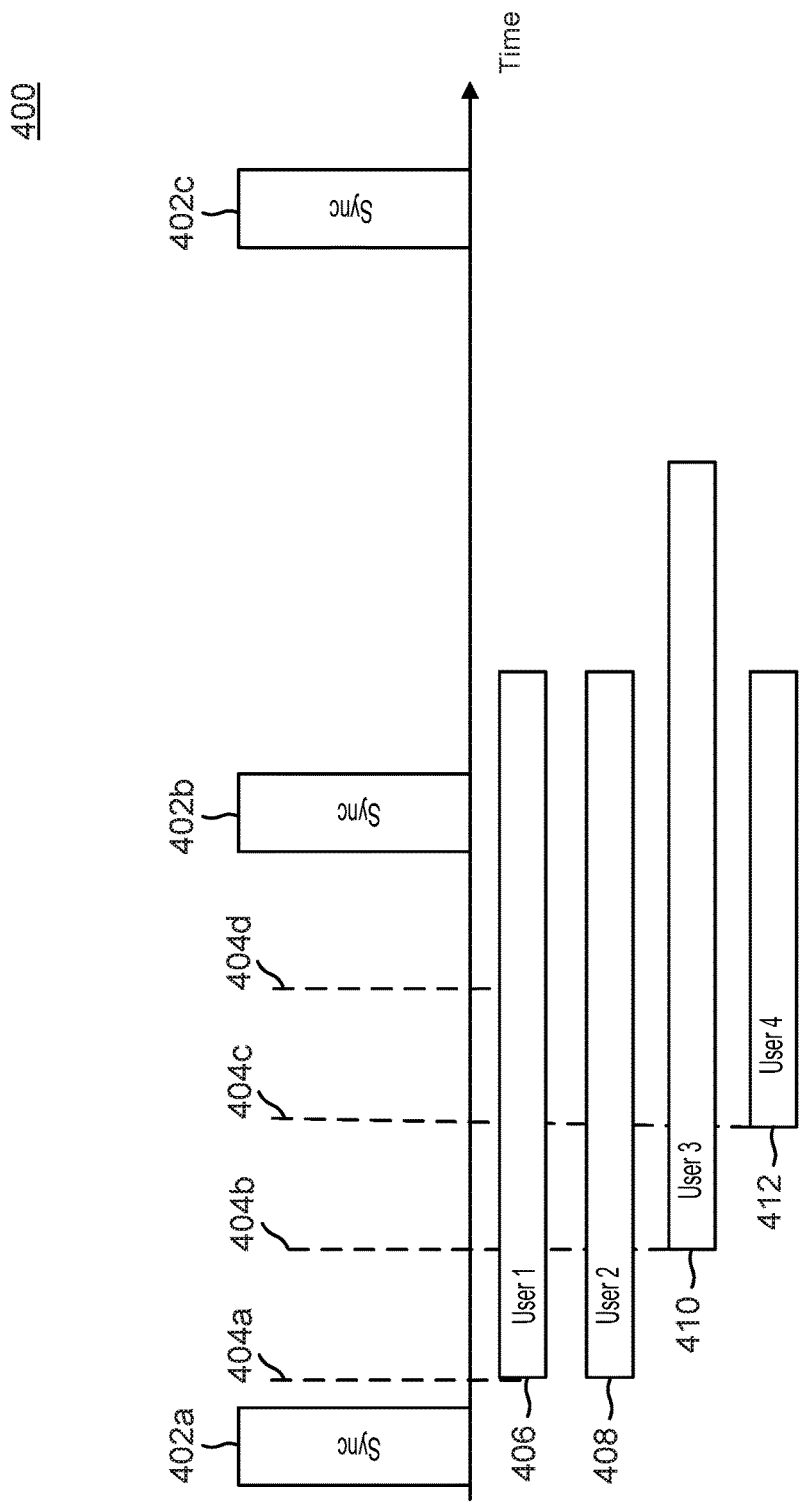
FIG. 4 is a diagram illustrating grant-less transmissions according to embodiments of the present disclosure.

FIG. 4 is a diagram 400 illustrating grant-less transmissions according to embodiments of the present disclosure. FIG. 4 illustrates four different IOE devices 106—IOE device 406 (user 1), IOE device 408 (user 2), IOE device 410 (user 3), and IOE device 412 (user 4) that initiate grant-less transmissions to a base station 104. As will be recognized, the four IOE devices shown are for ease in simplicity of illustration—more or fewer may initiate grant-less transmissions at given points in time according to embodiments of the present disclosure.

As shown in FIG. 4, a synchronization message 402a is transmitted from a base station 104 (e.g., a beacon) that the IOE devices 406-412 periodically wake up and synchronize with. In FIG. 4, each of the IOE devices 406-412 has data to transmit. After synchronization, each of the IOE devices 406-412 randomly selects an access resource from the common pool. As each access resource from the common pool has an access time associated with it, each IOE device 406-412 may initiate its particular transmission at a different time.

For example, IOE devices 406 and 408 start their grant-less transmissions at access time 404a, due to each randomly selecting access resources from the common pool that have the same access time 404a. Since each IOE device 406 and 408 randomly select access resources from the common pool, there is some probability that each will select the same access resource but also some probability that they will not. Thus, although each IOE device 406 and 408 selected access resources from the common pool that had the same access time, they may still have randomly selected different access resources from the common pool with respect to the particular scrambling code or interleaver permutation associated with the access time.

Continuing with the example of FIG. 4, IOE device 410 starts its grant-less transmission at access time 404b, due to randomly selecting an access resource from the common pool that has the access time 404b. Further, IOE device 412 starts its grant-less transmission at access time 404c, due to randomly selecting an access resource from the common pool that has the access time 404c. As illustrated in FIG. 4, the total transmission times for IOE devices 406-410 is longer than the total transmission time for IOE device 412.

Looking at IOE device 406 as a specific example, prior to initiating transmission the IOE device 406 may have already predicted that a transmission metric for the transmission would exceed a predetermined threshold (e.g., based on RSS, SNR, data size, bit rate, such as estimated for the uplink from a downlink measurement, and/or a total transmission time to name just a few examples). As such, the IOE device 406 may select a second access resource from the collision reduction pool. The IOE device 406 may select the second access resource from the collision reduction pool before, after, and/or at approximately the same time of selection of the access resource from the common pool. With the transmission initiated at access time 404a, the IOE device 406 may have included as part of its data a notification for the base station 104 to switch to the selected second access resource from the collision reduction pool (e.g., by including the selected second access resource and a number of subframes to delay before switching). As a result, the base station 104 and the IOE device 406 communicate briefly using the first access resource from the common pool but then switch to the second selected access resource from the collision reduction pool after the specified number of subframes (or a specified period of time) to continue transmitting the data to the base station 104 until completion.

Looking now at the IOE device 412 as another specific example with a shorter transmission time, prior to initiating transmission the IOE device 412 may have already predicted that a transmission metric would not exceed a threshold. As a result, the IOE device 412 may initiate and complete the grant-less transmission of its data using just the selected access resource from the common pool.

As another example, the IOE device 410 may initially predict (e.g., based on some measured quality of its downlink from the base station 104 and/or amount of data to be transmitted) that the uplink would not exceed a predetermined threshold and, therefore, not select a second access resource from the collision reduction pool prior to initiating the transmission. However, as the transmission commences, the IOE device 408 may determine that there is an asymmetry between the downlink and uplink, such that the transmission via the uplink is taking longer than predicted (and/or desired), increasing the probability of a collision with another IOE device 106 that may subsequently wake up and randomly select the same access resource from the common pool. As a result, the IOE device 410 may, upon this determination, randomly select a second access resource from the collision reduction pool and notify the base station 104 of the selected second access resource from the collision reduction pool and a number of subframes to wait before switching to the selected second access resource. The IOE device 410 may then switch during the transmission to the second access resource, thereby again reducing the probability of a collision as the transmission is completed.

Figure 5:
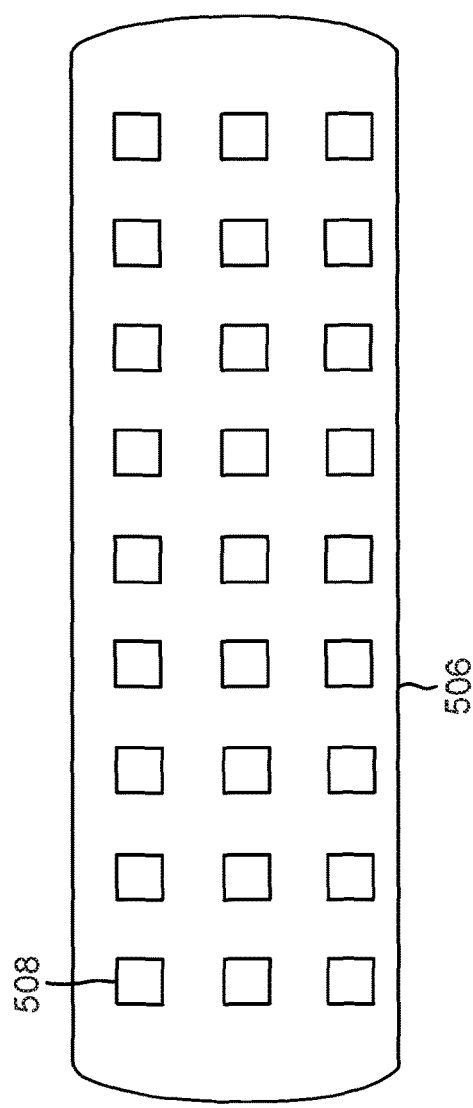
FIG. 5 is a diagram illustrating access resource pools for grant-less transmissions according to embodiments of the present disclosure.
Figure 5:
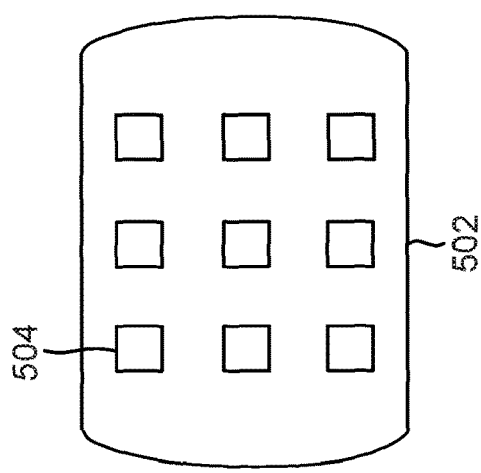

FIG. 5 shows a diagram illustrating access resource pools for grant-less transmissions according to embodiments of the present disclosure. In FIG. 5, a common pool 502 of access resources is illustrated as well as a collision reduction pool of access resources. The common pool 502 has a smaller number of access resources 504 than the collision reduction pool 506. Each access resource may be a pair of two resources, such as:

[scrambling code, access time]; or

[interleaver, access time].

A scrambling code is a particular bit sequence that can be used to scramble the data being transmitted to the base station 104, for example by multiplying the data bits with the scrambling code. An interleaver involves some permutation of the bits of the data being transmitted. These two pair alternatives are useful, for example, where non-orthogonal waveforms are used for the grant-less transmissions as described above. In embodiments where the cell 102 in FIG. 1 is small, another access resource could be the pair [frequency, access time] as will be recognized.

Returning to FIG. 5, the collision reduction pool 506 of access resources is an additional pool of access resources 508 that is kept separate from the common pool 502. As illustrated in FIG. 5, there are significantly more access resources 508 in the collision reduction pool 506 than access resources 504 in the common pool 502. As an example, there may be 10-30 times more access resources 508 in the collision reduction pool 506 (e.g., 16 or 32 access resources in the common pool 502 versus 500 to 1000 in the collision reduction pool 506). This is by way of example only; as will be recognized, other amounts may be maintained in each respective pool, with the number of access resources 508 in the collision reduction pool 506 being greater than the number of access resources 504 in the common pool 502. The access resources 508 in the collision reduction pool 506 may be in the same frequency band (e.g., where they are either the scrambling code or interleaver pairs) as the access resources 504 in the common pool 502, or alternatively be in different frequency bands. In an embodiment, the common pool 502 and the collision reduction pool 506 do not share any access resource pairs in common; thus, an IOE device 106 that has switched to using an access resource 508 from the collision reduction pool 506 does not have any probability of collision with another IOE device 106 that randomly selects an access resource from the common pool 502, because no access resource pairs are common between the two.

Both the common pool 502 and the collision reduction pool 506 may be received from the base station 104 at some prior point in time, for example as part of a system information block (SIB) message. These pools may then be stored in the IOE device 106, for example in the memory 204 described with respect to FIG. 2 below, and accessed as needed. These pools may remain static during transmissions or, alternatively, be updated periodically with information received from the base station 104, for example as part of another SIB message.

Figure 6:
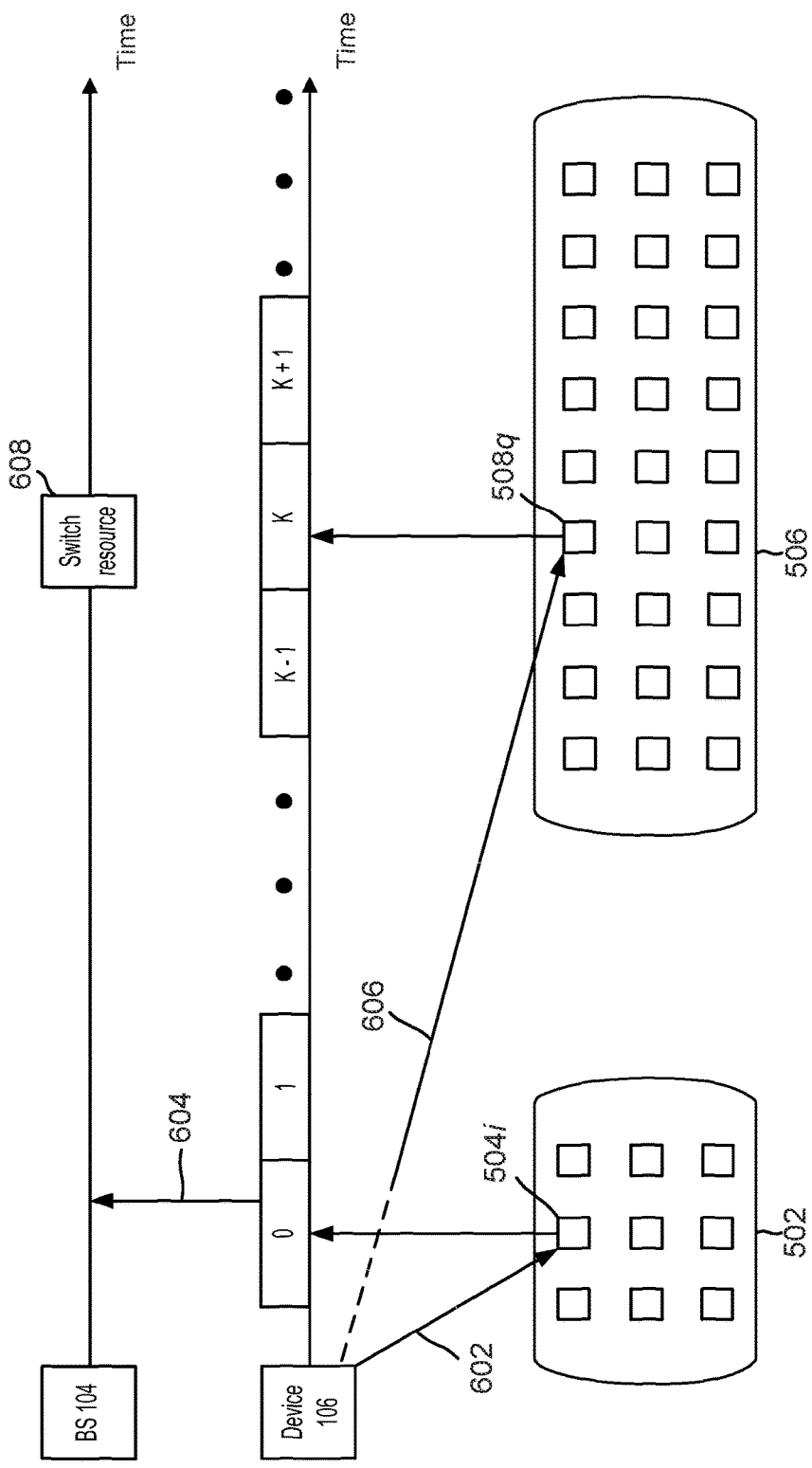
FIG. 6 is a diagram of grant-less transmission communications between devices according to embodiments of the present disclosure.

An exemplary communications flow that further illustrates the examples in FIGS. 4 and 5 is shown in FIG. 6, which illustrates a diagram of grant-less transmission communications between an IOE device 106 and a base station 104 according to embodiments of the present disclosure. As shown, FIG. 6 illustrates communications after the IOE device 106 has received a synchronization message 402 (and after receiving a SIB that contained the common pool 502 and collision reduction pool 506).

To begin a grant-less communication, the IOE device 106 randomly selects at action 602 the $i^{th}$ access resource 504 from among the access resources 504 in the common pool 502. The IOE device 106 initiates the grant-less communication with the base station 104 at action 604 using the selected access resource 504$i$ (e.g., starting with frames 0, 1, . . . etc.). If the amount of data to be transmitted is small and/or the uplink has sufficient quality, the transmission of the data takes a small enough amount of time that the IOE device 106 completes the grant-less transmission using the selected access resource 504$i$ without switching to a second access resource 508 from the collision reduction pool 506.

The amount of data to be transmitted may be larger and/or the uplink quality poor enough that transmission of the data may take more time and, therefore, increase the probability of collision. In embodiments where the IOE device 106 predicts that this will occur prior to initiating the grant-less transmission, the IOE device 106 may also randomly select a second access resource 508$q$ at action 606 from among the access resources 508 in the collision reduction pool 506 prior to initiating the grant-less transmission.

With the second access resource 508$q$ also selected, the IOE device 106 may initiate the grant-less transmission and, as part of the action 604, include the selected second access resource 508$q$ (together with a predetermined number of subframes to wait until the $k^{th}$ subframe) with the transmission.

After the base station 104 receives the selected second access resource 508$q$ (and the predetermined number of subframes in the message, unless according to an embodiment the predetermined number of subframes is a value stored at the base station 104 already), the base station 104 waits the predetermined number of subframes. During this time, the IOE device 106 continues transmitting data in subframes using the access resource 504$i$. Once the predetermined number of subframes has been reached, the base station 104 at action 608 switches to using the second selected access resource 508$q$ at the $k^{th}$ subframe at the same time as the IOE device 106. The IOE device 106 then continues the transmission using the second selected access resource 508$q$ until the transmission is complete. As a result, the probability of collision between IOE devices 106 selecting the same access resource 504 from the common pool 502 is further reduced, while also preventing the common pool 502 from being so large as to impose an excess burden in terms of search complexity at the base station 104.

As an alternative example, in embodiments where the IOE device 106 does not predict that collision is more likely to occur (e.g., based on a predicted transmission time or other transmission metric exceeding a predetermined threshold) prior to initiating a grant-less transmission, embodiments of the present disclosure may still be realized. For example, as the transmission commences using the access resource 504$i$ without having also selected a second access resource 508 from the collision reduction pool, the IOE device 106 may monitor the uplink and/or transmission time and compare the metric to a threshold. If the threshold is exceeded, or is predicted to be exceeded based on changing information of the uplink and/or transmission time, the IOE device 106 may then proceed with action 606 and select the second access resource 508$q$.

Once selected, the IOE device 106 may include the selected second access resource 508$q$ with the current data segment being transmitted to the base station 104 (including a number of subframes to wait before switching) and notify the base station 104 of the intent to switch to the second access resource 508$q$ at the $k^{th}$ subframe. Upon reaching the $k^{th}$ subframe, the base station 104 and the IOE device 106 may switch to the second access resource 508$q$ as described above.

Figure 7:
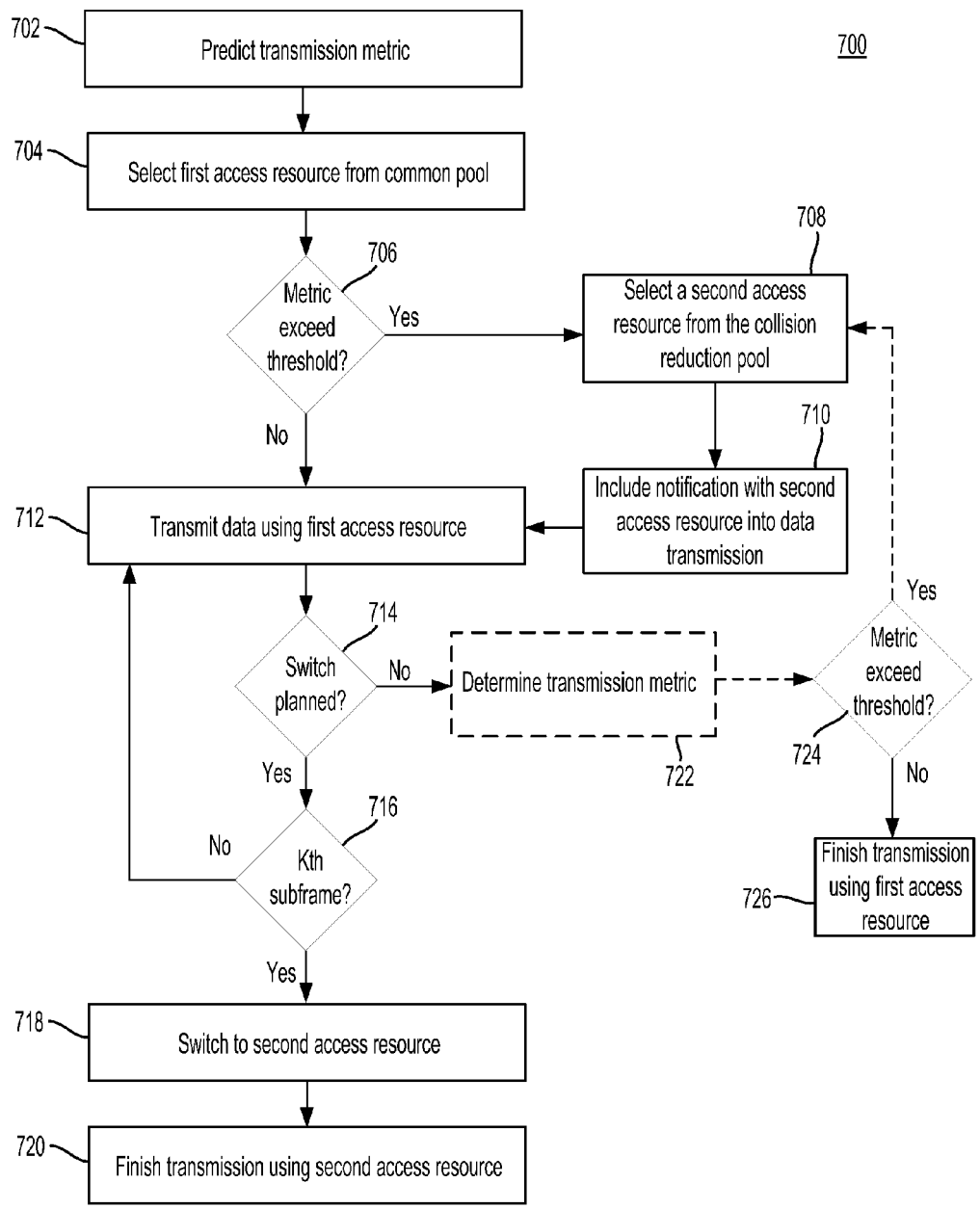
FIG. 7 is a flowchart illustrating an exemplary method for reducing collisions in grant-less transmissions according to embodiments of the present disclosure.

FIG. 7 is a flowchart illustrating an exemplary method 700 for reducing collisions in grant-less transmissions according to embodiments of the present disclosure. The method 700 may be implemented in the IOE device 106. The method 700 will be described with respect to a single IOE device 106 for simplicity of discussion, though it will be recognized that the aspects described herein may be applicable to a plurality of IOE devices 106, including a network of IOE devices. It is understood that additional method blocks can be provided before, during, and after the blocks of method 700, and that some of the blocks described can be replaced or eliminated for other embodiments of the method 700.

At block 702, prior to the initiation of a grant-less transmission, the IOE device 106 predicts a transmission metric for the uplink. For example, IOE device 106 may use a transmission access resource selection module 208 in cooperation with other elements of the IOE device 106 to determine one or more parameters/metrics of a downlink from the base station 104. This may include, for example, monitoring downlink information from the base station 104 (e.g., one or more broadcasts/beacons/other types of synchronization signals) to determine the RSS, SNR, bit rate, etc. of the downlink. The IOE device 106 may use this information to predict one or more transmission metrics for the uplink, including for example predicting an estimated transmission time based on the data size and predicted uplink metrics (or measured downlink metrics). In addition or in the alternative, the IOE device 106 may analyze the size of data to be transmitted as the transmission metric.

At block 704, the IOE device 106 randomly selects a first access resource 504 from the common pool of access resources 502. The IOE device 106 uses this first access resource 504 when it begins transmitting its data.

At decision block 706, the IOE device 106 determines whether the predicted transmission metric exceeds a threshold (which may involve a value above the threshold or below the threshold, depending on the threshold type). For example, the IOE device 106 may compare the predicted metric against one or more threshold values to assist in determining whether it may be useful to transition from the first access resource 504 from the common pool 502 to a second access resource 508 from the collision reduction pool 506 during the transmission. For example, the threshold may be a RSS threshold, a SNR threshold, a bit rate threshold, a data size threshold, and/or a predicted transmission time threshold to name just a few examples.

If, as a result of the decision block 706, it is determined that the predicted metric exceeds the threshold, the method 700 proceeds to block 708. At block 708, the IOE device 106 randomly selects a second access resource 508 from the collision reduction pool 506, which as described above can be significantly larger than the common pool 502. In an embodiment, the IOE device 106 may select both of the access resources 504/508 at or near the same time, while in other embodiments the procedure may be sequential.

At block 710, the IOE device 106 includes a notification with the data to be transmitted that identifies the second access resource 508 that was selected at block 708. Further, the IOE device 106 may include a specified number of subframes that the IOE device 106 and the base station 104 need to wait before switching to the second access resource 508. In some embodiments, the number of subframes may not need to be included where it is provisioned at both the IOE device 106 and the base station 104, while in other embodiments the number is included.

At block 712, the IOE device 106 initiates a grant-less transmission with the base station 104 using the first access resource 504 that was selected at block 704. If it is determined, at step 706, that the predicted metric exceeds or will exceed the threshold, then the grant-less transmission at block 712 can include the notification to the base station 104 (from block 710) to switch to the second access resource 508 (selected in block 708) at a $k^{th}$ subframe after the current subframe. If it is determined, at block 706, that the predicted metric does not exceed or will not exceed the threshold, then the method 700 can proceed to block 712 without selecting a second access resource 508 from the collision reduction pool 506 (block 708) and including a corresponding notification (block 710). As a result, blocks 708 and 710 can be skipped.

At decision block 714, if a switch is planned (e.g., a second access resource 508 was selected and the base station 104 was notified), then the method 700 proceeds to decision block 716.

At decision block 716, the IOE device 106 determines whether the transmission has reached the $k^{th}$ subframe as the point specified at which the switch to the second access resource 508 will occur. If the transmission has not reached the $k^{th}$ subframe, then method 700 returns to block 712 to continue transmitting the data. If the transmission has reached $k^{th}$ subframe, then the method 700 proceeds to block 718.

At block 718, the IOE device 106 switches to the second access resource 508 (at the same subframe as the base station 104, as specified in the notification or otherwise).

At block 720, the IOE device 106 continues transmitting the data using the second access resource 508 instead of the first access resource 504. The IOE device 106 can continue transmitting the data using the second access resource 508 until the transmission is completed.

Returning to decision block 714, if no switch is planned, the method 700 proceeds either to optional block 722 or to block 726. At block 726, the IOE device 106 finishes transmitting the data using the first access resource 504. This may occur, for example, because the amount of data is small and/or the transmission time (based on uplink quality and/or data size, for example) does not exceed a time threshold and, therefore, does not have an increasing probability of collision as occurs with transmissions that take longer.

Focusing now on the optional block 722, it is also possible that during transmission using the first access resource 504, the IOE device 106 may still determine (dynamically, during the transmission) that some transmission metric (or multiple metrics) has or is predicted to exceed one or more thresholds. Thus, at block 722 the IOE device 106 determines a transmission metric. To do so, the IOE device 106 may monitor the uplink to the base station 104 and, based on the uplink quality and/or transmission duration, determine one or more transmission metrics such as those described at block 702.

At optional decision block 724, the IOE device 106 determines whether the measured (or predicted/calculated) metric exceeds the threshold, similar to the description above with respect to decision block 706. In this manner, the IOE device 106 determines whether during transmission the metric (and, indirectly, the probability of collision) has transitioned (or is predicted to transition) beyond a threshold level (e.g., by determining a signal metric, data size metric, transmission time metric, etc.).

If the metric exceeds (or is now predicted to exceed) the threshold, then the method 700 proceeds to block 708 where the IOE device 106 randomly selects a second access resource 508 from the collision reduction pool 506 and proceeds as described above with respect to blocks 708-714 and so on.

Returning to optional decision block 724, if the metric does not exceed (or is not predicted to exceed) the threshold, then the method 700 proceeds to block 726 that operates as described above.

As a result of the above, the probability of a collision is significantly reduced because of the larger pool of available access resources in the collision reduction pool 506 compared to the number of available access resources in the common pool 502. Further, this is accomplished without significantly adding to the search complexity at the base station 104, because the base station 104 still searches the common pool 502, without including the collision reduction pool 506, where the common pool 502 has not been expanded.

Figure 8:
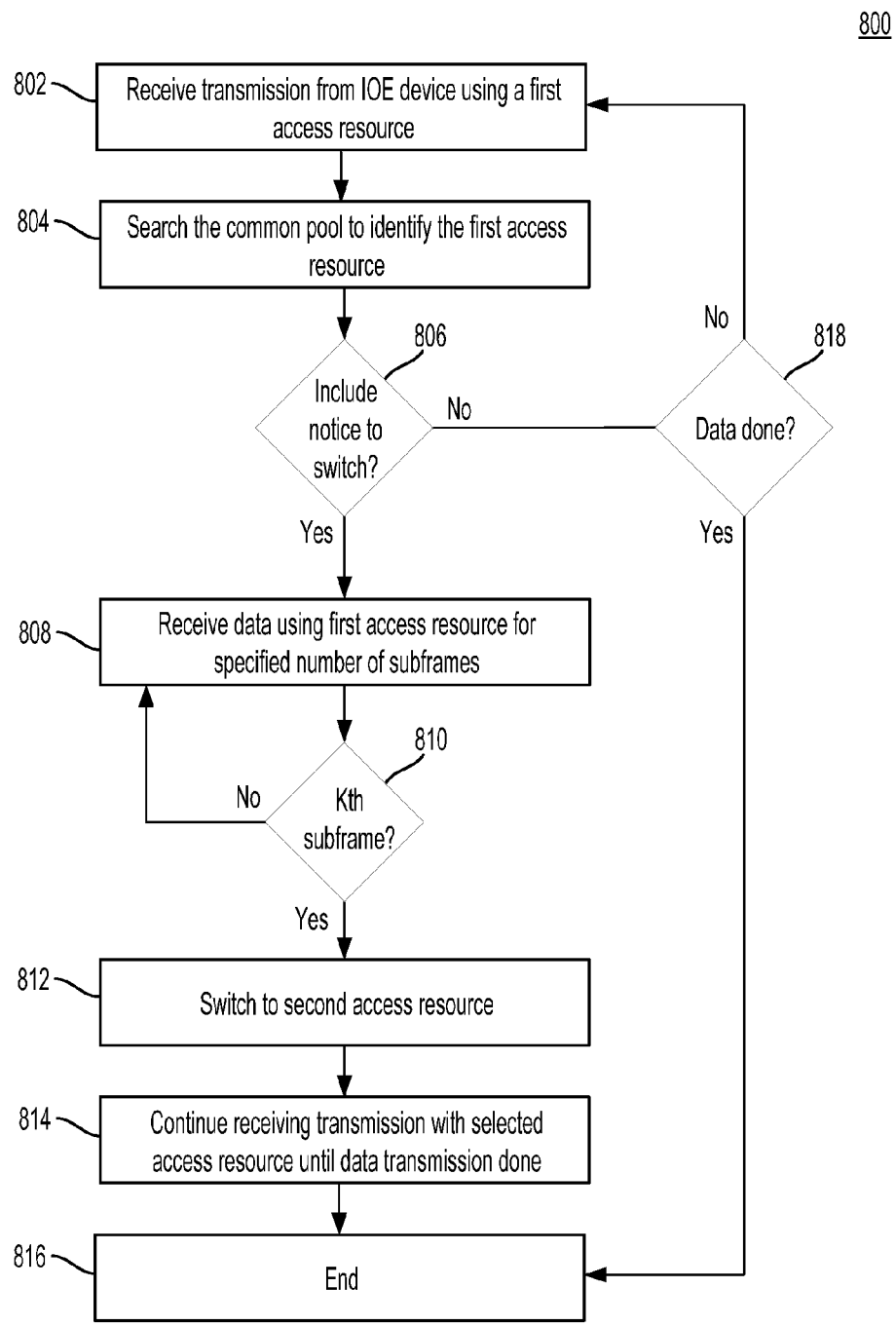
FIG. 8 is a flowchart illustrating an exemplary method for reducing collisions in grant-less transmissions according to embodiments of the present disclosure.

FIG. 8 is a flowchart illustrating an exemplary method 800 for reducing collisions in grant-less transmissions according to embodiments of the present disclosure. The method 800 may be implemented in the base station 104. The method 800 will be described with respect to a single base station 104 in communication with a single IOE device 106 for simplicity of discussion, though it will be recognized that the aspects described herein may be applicable to a plurality of IOE devices 106 and/or base stations 104. It is understood that additional method blocks can be provided before, during, and after the blocks of method 800, and that some of the blocks described can be replaced or eliminated for other embodiments of the method 800.

At block 802, the base station 104 receives a grant-less transmission from an IOE device 106 using a first access resource. As described with respect to the various figures above, the IOE device 106 randomly selects the first access resource 504 from the common pool 502, where the base station 104 may have previously transmitted the common pool 502 (and the collision reduction pool 506) at some prior point in time, for example as part of a system information block (SIB).

At block 804, the base station 104 searches the common pool 502 in order to identify the first access resource 504 from common pool 502 used to transmit the data (and, thereby, to be able to process the transmission). According to embodiments of the present disclosure, the number of access resources in the common pool 502 is kept to a manageable amount so as to prevent the search complexity from increasing for the base station 104. The base station 104 performs this searching because, due to the grant-less transmission, the base station 104 does not know when particular IOE devices 106 wake up or what access resources they select until the base station 104 receives a transmission. In an embodiment, the base station 104 searches by comparing a received grant-less transmission to each scrambling code or interleaver in the common pool of access resources in order to detect which particular scrambling code or interleaver results in a high energy output.

At decision block 806, the base station 104 determines whether a notice to switch to a second access resource 508 from the collision reduction pool 506 was included in the transmission from the IOE device 106.

If a notice was included, then the method 800 proceeds to block 808 where the base station 104 receives data in the transmission over multiple subframes while tracking the subframes. If a notice was not included, then the method 800 proceeds to decision block 818, where the base station determines whether the data transmission has completed. If the data transmission has not completed, then the method 800 returns to block 802 to continue receiving the grant-less transmission and proceeds as described above (and further below). If, instead, the data transmission has completed then the method 800 proceeds to block 816 and ends.

Returning to block 808, the method 800 proceeds to decision block 810. At decision block 810, the base station 104 determines whether the transmission has reached the $k^{th}$ subframe (the point specified in the notification at which the switch to the second access resource 508 will occur). If the transmission has not reached the $k^{th}$ subframe, then method 800 returns to block 808 to continue receiving the data in the transmission. If the transmission has reached $k^{th}$ subframe, then the method 800 proceeds to block 812.

At block 812, the base station 104 switches to the second access resource 508 identified in the notification.

At block 814, the base station 104 continues receiving data in the transmission using the second access resource 508 until the transmission is completed, at which point the method 800 proceeds to block 816 and ends.

As a result of the above, the base station 104 avoids further additions to search complexity because the common pool 502 is kept to a manageable size, while the probability of collision is significantly reduced because of the larger pool of available access resources in the collision reduction pool 506 (that the base station 104 does not search) compared to the number of available access resources in the common pool 502. Further, the common pool 502 and the collision reduction pool 506 may both be broadcast from the base station 104, for example prior to the above elements and/or after, such as to provide updated pool information.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing a first wireless communications device to transmit, to a second wireless communications device, a first subset of the data using a first access resource selected from a common pool of access resources as part of a grant-less transmission. The program code further comprises code for causing the first wireless communications device to notify the second wireless communications device of a transition to a second access resource selected from a collision reduction pool in response to a determination that the grant-less transmission exceeds a threshold, the collision reduction pool being separate from the common pool. The program code further comprises code for causing the second wireless communications device to transmit a second subset of the data to the second wireless communications device using the second access resource after transitioning to the second access resource.

The computer-readable medium further includes code for causing the first wireless communications device to notify the second wireless communications device to transition to the second access resource after a fixed number of subframes, wherein the first wireless communications device begins transmitting the second subset of the data after the fixed number of subframes. The computer-readable medium further includes code for causing the first wireless communications device to select the first access resource, and code for causing the first wireless communications device to select the second access resource. The computer-readable medium further includes code for causing the first wireless communications device to select the first and second access resources before the transmitting the first subset of the data. The computer-readable medium further includes wherein the first and second access resources are selected randomly from the common pool and collision reduction pool, respectively. The computer-readable medium further includes wherein copies of the common pool and the collision reduction pool are stored in a memory of the first wireless communications device. The computer-readable medium further includes code for causing the first wireless communications device to complete the transmitting using the second access resource, wherein the second subset of the data includes a remaining amount of the data. The computer-readable medium further includes code for causing the first wireless communications device to analyze a downlink message from the second wireless communications device prior to initiating the transmission of the first subset of the data, code for causing the first wireless communications device to predict a transmission metric for the transmission of the data based at least in part of the analysis of the downlink message, and code for causing the first wireless communications device to compare the predicted transmission metric with the threshold to determine if the predicted transmission metric exceeds the threshold. The computer-readable medium further includes code for causing the first wireless communications device to determine a transmission metric during the transmitting of the first subset of the data, code for causing the first wireless communications device to compare the determined transmission metric with the threshold during the transmitting of the first subset of the data to determine if the determined transmission metric exceeds the threshold, code for causing the first wireless communications device to select the second access resource in response to the comparing, and code for causing the first wireless communications device to include, as part of the first subset of the data, the notification for the second wireless communications device to transition to the second access resource in response to the selection. The computer-readable medium further includes wherein the common pool of access resources and the collision reduction pool each comprises at least one of scrambling code/access time pairs or interleaver/access time pairs and wherein the first wireless communications device comprises an internet of everything device and the second wireless communications device comprises a base station.

Embodiments of the present disclosure further include a computer-readable medium having program code recorded thereon, the program code comprising code for causing a first wireless communications device to search a common pool of access resources to recover a first subset of the data received from a second wireless communications device using a first access resource selected from the common pool of access resources as part of a grant-less transmission. The program code further includes code for causing the first wireless communications device to receive a notification from the second wireless communications device to transition to a second access resource selected from a collision reduction pool, the collision reduction pool being separate from the common pool. The program code further includes code for causing the first wireless communications device to switch to the second access resource to recover a second subset of the data from the second wireless communications device without searching the collision reduction pool.

The computer-readable medium further includes wherein the notification comprises a fixed number of subframes to delay before transitioning to the second access resource. The computer-readable medium further includes code for causing the first wireless communications device to receive the notification as part of the first subset of the data from the second wireless communications device. The computer-readable medium further includes code for causing the first wireless communications device to receive the notification using the first access resource after receiving at least a portion of the first subset of the data. The computer-readable medium further includes wherein the common pool of access resources and the collision reduction pool each comprises at least one of scrambling code/access time pairs or interleaver/access time pairs. The computer-readable medium further includes code for causing the first wireless communications device to determine a range of access resources to include in the common pool of access resources and in the collision reduction pool. The computer-readable medium further includes code for causing the first wireless communications device to transmit the determined common pool of access resources and the collision reduction pool to the second wireless communications device, wherein the first wireless communications device comprises a base station and the second wireless communications device comprises an internet of everything device.

Embodiments of the present disclosure further include a first wireless communications device comprising means for transmitting, to a second wireless communications device, a first subset of the data using a first access resource selected from a common pool of access resources as part of a grant-less transmission. The first wireless communications device further comprises means for notifying the second wireless communications device of a transition to a second access resource selected from a collision reduction pool in response to a determination that the grant-less transmission exceeds a threshold, the collision reduction pool being separate from the common pool. The first wireless communications device further comprises means for transmitting a second subset of the data to the second wireless communications device using the second access resource after transitioning to the second access resource.

The first wireless communications device further includes means for notifying the second wireless communications device to transition to the second access resource after a fixed number of subframes, wherein the first wireless communications device begins transmitting the second subset of the data after the fixed number of subframes. The first wireless communications device further includes means for selecting the first access resource, and means for selecting the second access resource. The first wireless communications device further includes means for selecting the first and second access resources before the transmitting the first subset of the data. The first wireless communications device further includes wherein the first and second access resources are selected randomly from the common pool and collision reduction pool, respectively. The first wireless communications device further includes wherein copies of the common pool and the collision reduction pool are stored in a memory of the first wireless communications device.

The first wireless communications device further includes means for completing the transmitting using the second access resource, wherein the second subset of the data includes a remaining amount of the data. The first wireless communications device further includes means for analyzing a downlink message from the second wireless communications device prior to initiating the transmission of the first subset of the data, means for predicting a transmission metric for the transmission of the data based at least in part of the analysis of the downlink message, and means for comparing the predicted transmission metric with the threshold to determine if the predicted transmission metric exceeds the threshold. The first wireless communications device further includes means for determining a transmission metric during the transmitting of the first subset of the data, means for comparing the determined transmission metric with the threshold during the transmitting of the first subset of the data to determine if the determined transmission metric exceeds the threshold, means for selecting the second access resource in response to the comparing, and means for including, as part of the first subset of the data, the notification for the second wireless communications device to transition to the second access resource in response to the selection. The first wireless communications device further includes wherein the common pool of access resources and the collision reduction pool each comprises at least one of scrambling code/access time pairs or interleaver/access time pairs and wherein the first wireless communications device comprises an internet of everything device and the second wireless communications device comprises a base station.

Embodiments of the present disclosure further include a first wireless communications device comprising means for searching a common pool of access resources to recover a first subset of the data received from a second wireless communications device using a first access resource selected from the common pool of access resources as part of a grant-less transmission. The first wireless communications device further comprises means for receiving a notification from the second wireless communications device to transition to a second access resource selected from a collision reduction pool, the collision reduction pool being separate from the common pool. The first wireless communications device further comprises means for switching to the second access resource to recover a second subset of the data from the second wireless communications device without searching the collision reduction pool.

The first wireless communications device further includes wherein the notification comprises a fixed number of subframes to delay before transitioning to the second access resource. The first wireless communications device further includes means for receiving the notification as part of the first subset of the data from the second wireless communications device. The first wireless communications device further includes means for receiving the notification using the first access resource after receiving at least a portion of the first subset of the data. The first wireless communications device further includes wherein the common pool of access resources and the collision reduction pool each comprises at least one of scrambling code/access time pairs or interleaver/access time pairs. The first wireless communications device further includes means for determining a range of access resources to include in the common pool of access resources and in the collision reduction pool. The first wireless communications device further includes means for transmitting the determined common pool of access resources and the collision reduction pool to the second wireless communications device, wherein the first wireless communications device comprises a base station and the second wireless communications device comprises an internet of everything device. The first wireless communications device further includes code for causing a computer to perform one or more of the aspects of the above-noted features.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, comprising:
   transmitting, from a first wireless communications device to a second wireless communications device, a first set of data using a first access resource selected from a common pool of access resources as part of a grant-less transmission;
   selecting, by the first wireless communication device in response to a determination that the grant-less transmission exceeds a threshold, a second access resource from a collision reduction pool that is configured to share resources in grant-less transmissions, wherein the collision reduction pool is separate from, and larger than, the common pool;
   notifying, by the first wireless communications device, the second wireless communications device of a transition to the second access resource selected from the collision reduction pool, the notifying indicating the selected second access resource; and
   transmitting, by the first wireless communications device, a second set of data to the second wireless communications device using the second access resource after transitioning to the second access resource.

2. The method of claim 1, wherein the notifying further comprises:
   notifying the second wireless communications device to transition to the second access resource after a fixed number of subframes, wherein the first wireless communications device begins transmitting the second set of data after the fixed number of subframes.

3. The method of claim 1, further comprising:
   selecting, by the first wireless communications device, the first access resource before the transmitting the first set of data; and
   selecting, by the first wireless communications device, the second access resource before the transmitting the first set of data,
   wherein the first and second access resources are selected randomly from the common pool and collision reduction pool, respectively.

4. The method of claim 1, further comprising:
   receiving, prior to the transmitting the first set of data, the common pool and the collision reduction pool from the second wireless communications device as part of one or more broadcasts.

5. The method of claim 1, further comprising:
   completing the transmitting using the second access resource, wherein the second set of data includes a remaining amount of data to the first set of data.

6. The method of claim 1, wherein the determination comprises:
analyzing, by the first wireless communications device, a downlink message from the second wireless communications device prior to initiating the transmission of the first set of data;
predicting, by the first wireless communications device, a transmission metric for the transmission of data including the first set of data based at least in part on the analysis of the downlink message; and
comparing, by the first wireless communications device, the predicted transmission metric with the threshold to determine if the predicted transmission metric exceeds the threshold.

7. The method of claim 1, further comprising:
determining, by the first wireless communications device, a transmission metric during the transmitting of the first set of data;
comparing, by the first wireless communications device, the determined transmission metric with the threshold during the transmitting of the first set of data to determine if the determined transmission metric exceeds the threshold;
selecting, by the first wireless communications device, the second access resource in response to the comparing; and
including, as part of the first set of data, the notification for the second wireless communications device to transition to the second access resource in response to the selection.

8. The method of claim 1, wherein:
the common pool of access resources and the collision reduction pool each comprises at least one of scrambling code/access time pairs or interleaver/access time pairs;
the first wireless communications device comprises an internet of everything device and the second wireless communications device comprises a base station; and
the common pool and the collision reduction pool are both shared among a plurality of internet of everything devices.

9. A method for wireless communication, comprising:
searching, by a first wireless communications device, a common pool of access resources to recover a first set of data received from a second wireless communications device using a first access resource selected from the common pool of access resources as part of a grant-less transmission;
receiving, at the first wireless communications device, a notification from the second wireless communications device to transition to a second access resource selected from a collision reduction pool that is configured to share resources in grant-less transmissions, the notification indicating the selected second access resource, and the collision reduction pool being separate from, and larger than, the common pool; and
switching, at the first wireless communications device, to the second access resource to recover a second set of data from the second wireless communications device without searching the collision reduction pool.

10. The method of claim 9, wherein the notification comprises a fixed number of subframes to delay before transitioning to the second access resource.

11. The method of claim 9, wherein the receiving the notification further comprises:
receiving the notification as part of the first set of data from the second wireless communications device.

12. The method of claim 9, wherein the receiving the notification further comprises:
receiving the notification using the first access resource after receiving at least a portion of the first set of data.

13. The method of claim 9, wherein the common pool of access resources and the collision reduction pool each comprises at least one of scrambling code/access time pairs or interleaver/access time pairs.

14. The method of claim 9, further comprising:
determining a range of access resources to include in the common pool of access resources and in the collision reduction pool.

15. The method of claim 14, further comprising:
broadcasting, from the first wireless communications device, the determined common pool of access resources and the collision reduction pool to the second wireless communications device, wherein the first wireless communications device comprises a base station and the second wireless communications device comprises an internet of everything device.

16. A first wireless communications device, comprising:
a processor configured to:
select a first access resource from a common pool of access resources as part of a grant-less transmission to a second wireless communications device; and
in response to a determination that the grant-less transmission exceeds a threshold, select a second access resource from a collision reduction pool that is configured to share resources in grant-less transmissions, the collision reduction pool being separate from, and larger than, the common pool; and
a transceiver configured to:
transmit a first set of data to the second wireless communications device using the first access resource, wherein the first set of data includes a notification for the second wireless communications device of a transition to the second access resource in response to the determination, the notification indicating the selected second access resource; and
transmit a second set of data to the second wireless communications device using the second access resource.

17. The first wireless communications device of claim 16, wherein the processor is further configured to include with the notification a fixed number of subframes to delay before transitioning to the second access resource.

18. The first wireless communications device of claim 16, further comprising:
a memory configured to store the common pool of access resources and the collision reduction pool, the common pool of access resources and the collision reduction pool each comprising at least one of scrambling code/access time pairs or interleaver/access time pairs,
wherein the processor is further configured to select the first access resource randomly and select the second access resource randomly, prior to transmitting the first set of data.

19. The first wireless communications device of claim 16, wherein the transceiver is further configured to:
receive, prior to the transmission of the first set of data, the common pool and the collision reduction pool from the second wireless communications device as part of one or more broadcasts.

20. The first wireless communications device of claim 16, wherein the transceiver is further configured to complete transmission of the second set of data using the second access resource, wherein the second set of data includes a remaining amount of the data.

21. The first wireless communications device of claim 16, wherein the processor is further configured to:
    analyze a downlink message from the second wireless communications device prior to initiating the transmission of the first set of the data;
    predict a transmission metric for the transmission of the data based at least in part on the analysis of the downlink message; and
    compare the predicted transmission metric with the threshold to determine if the predicted transmission metric exceeds the threshold.

22. The first wireless communications device of claim 16, wherein the processor is further configured to:
    determine a transmission metric during the transmission of the first set of the data;
    compare the determined transmission metric with the threshold during the transmission of the first set of the data to determine if the determined transmission metric exceeds the threshold;
    select the second access resource in response to the comparison; and
    include, as part of the first set of the data, the notification for the second wireless communications device to transition to the second access resource in response to the selection.

23. The first wireless communications device of claim 16, wherein the first wireless communications device comprises an internet of everything device and the second wireless communications device comprises a base station, and the common pool and the collision reduction pool are both shared among a plurality of internet of everything devices.

24. A first wireless communications device, comprising:
    a transceiver configured to:
        receive a first set of data from a second wireless communications device, wherein the first set of the data is transmitted using a first access resource selected from a common pool of access resources as part of a grant-less transmission from the second wireless communications device; and
        receive a notification from the second wireless communications device to transition to a second access resource selected from a collision reduction pool that is configured to share resources in grant-less transmissions, the notification indicating the selected second access resource, and the collision reduction pool being separate from, and larger than, the common pool; and
    a processor configured to:
        search the common pool of access resources to recover the first set of data received from the second wireless communications device; and
        switch the transceiver to the second access resource to recover a second set of data from the second wireless communications device without searching the collision reduction pool.

25. The first wireless communications device of claim 24, wherein the notification comprises a fixed number of subframes to delay before transitioning to the second access resource.

26. The first wireless communications device of claim 24, wherein the transceiver is further configured to receive the notification as part of the first set of the data from the second wireless communications device.

27. The first wireless communications device of claim 24, wherein the transceiver is further configured to receive the notification using the first access resource after receiving at least a portion of the first set of the data.

28. The first wireless communications device of claim 24, wherein the common pool of access resources and the collision reduction pool each comprises at least one of scrambling code/access time pairs or interleaver/access time pairs.

29. The first wireless communications device of claim 24, wherein:
    the processor is further configured to determine a range of access resources to include in the common pool of access resources and in the collision reduction pool, and
    the transceiver is further configured to broadcast the determined common pool of access resources and the collision reduction pool to the second wireless communications device.

30. The first wireless communications device of claim 24, wherein first wireless communications device comprises a base station and the second wireless communications device comprises an internet of everything device.

* * * * *